United States Patent [19]

Wilkinson et al.

[11] 4,085,941
[45] Apr. 25, 1978

[54] STERN SEALS FOR SHIPS

[75] Inventors: Samuel Clifford Walter Wilkinson; Ronald Sydney Sweett, both of Chichester; Thomas Walter Bunyan, London, all of England

[73] Assignee: Crane Packing Limited, Slough, England

[21] Appl. No.: 694,956

[22] Filed: Jun. 11, 1976

[51] Int. Cl.² ............................................. F16J 15/34
[52] U.S. Cl. ........................................ 277/3; 277/29; 277/59; 277/71; 277/88
[58] Field of Search .................. 277/3, 71, 59, 61, 63, 277/88, 153, 27, 29; 308/36.1

[56] References Cited

U.S. PATENT DOCUMENTS

| 3,176,996 | 4/1965 | Barnett | 277/3 |
|---|---|---|---|
| 3,403,915 | 10/1968 | Roberts | 277/3 |
| 3,480,285 | 11/1969 | Anderson | 277/88 |
| 3,599,993 | 8/1971 | Eriksson | 277/59 |
| 3,631,834 | 1/1972 | Gardner et al. | 277/3 |
| 3,825,270 | 7/1974 | Paramonoff et al. | 277/71 |
| 3,894,741 | 7/1975 | McHugh | 277/59 |
| 3,934,952 | 1/1976 | Gardner | 308/36.1 |

*Primary Examiner*—Richard E. Aegerter
*Assistant Examiner*—L. Footland
*Attorney, Agent, or Firm*—Scrivener, Parker, Scrivener and Clarke

[57] ABSTRACT

In a stern seal and bearing assembly for the stern shaft of a ship there is an oil seal assembly at the outboard end of the bearing and a sea water seal (preferably a face seal) axially spaced from it, with a drain from the space between the two, and the oil seal assembly comprises a pair of lip seals directed towards each other with a drain from the space between them. The oil supply to the bearing can be at low pressure, for example simply the static head from a tank slightly above the level of the bearing, and the last-mentioned drain may have a swan neck above the oil level.

7 Claims, 1 Drawing Figure

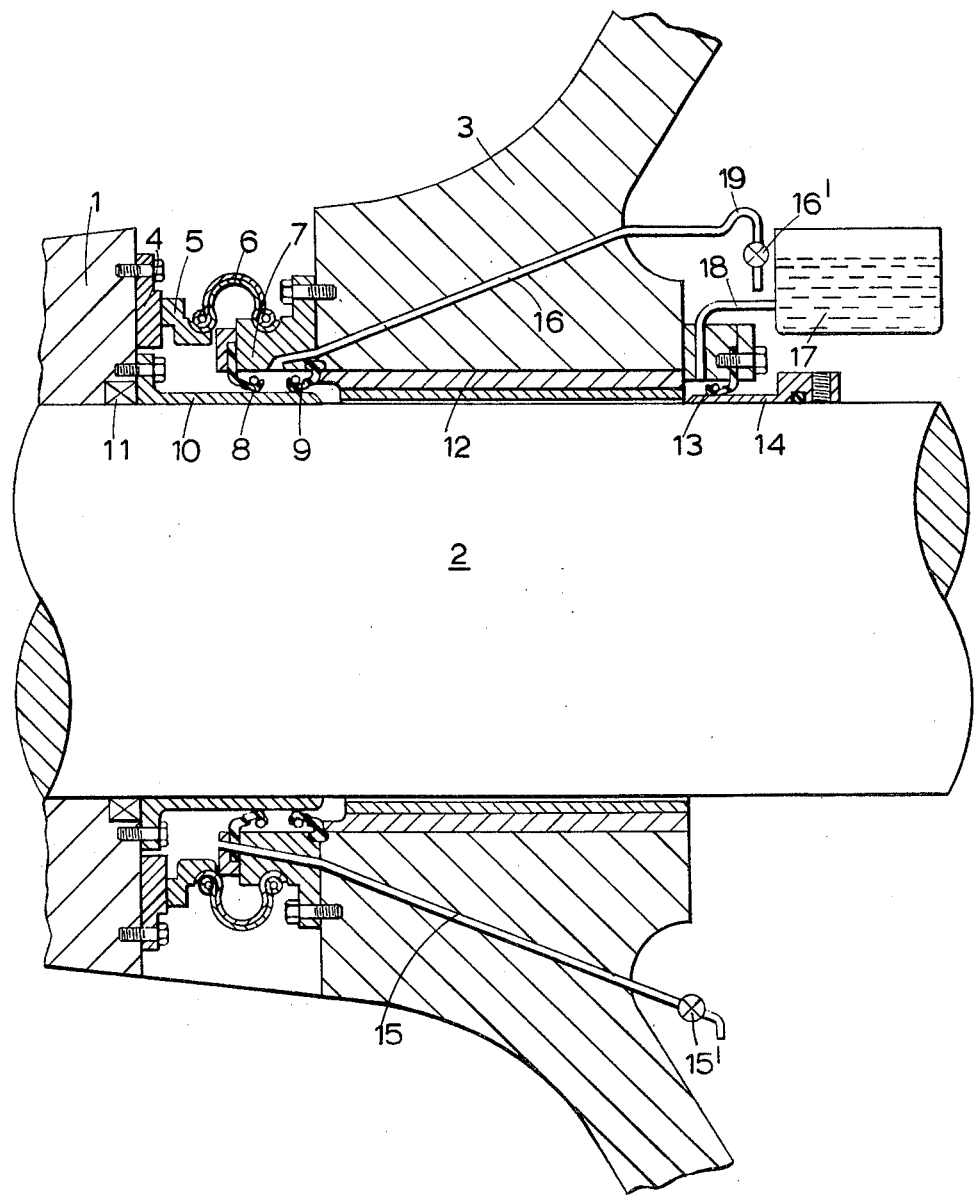

STERN SEALS FOR SHIPS

This invention relates to stern seals for the propeller shafts of ships. Not only is it necessary to prevent sea-water leaking into the hull of the ship but it is also necessary, and indeed becoming a legal requirement, to prevent oil from the stern bearing of the shaft from escaping into the sea and causing pollution.

It has been proposed to provide an annular air space between, on the one hand, a stern seal that keeps out the sea-water and, axially spaced from it, an oil seal at the outboard end of the bearing, so that any oil leaking past the oil seal and any sea-water leaking past the oil seal both only reach this air space and can be conducted away to a tank for separation.

This is fine as far as it goes, but in the event of gradual wear or failure, leading to severe or even catastrophic leakage there is nothing to warn of the danger, apart from periodic checks; moreover there is little that can be done to remedy the situation without dry-docking.

Moreover the presence of a substantial air space between the sea-water seal and the stern bearing is in conflict with the need to keep the stern bearing as close to the propeller as possible, so as to keep the overhang to a minimum.

The aim of the present invention is to provide a compact stern seal and bearing assembly that not only avoids pollution of the surrounding sea but moreover responds to failure and allows continued use in an emergency while action is taken to remedy the fault, all this being without the complications involved in having to provide external high pressure supplies of oil and/or water.

According to the invention there is now proposed a stern seal and bearing assembly for ships comprising an oil-lubricated shaft bearing fed with low pressure oil and having at least at its outboard end two lip seals directed towards one another, a sea-water seal axially spaced away from these lip seals in an outboard direction, a drain from the air space between the lip seals and the outboard seal and a further drain from the space between the lip seals.

In the event of failure of the lip seals, oil will flow into the air space and the presence of oil in the drain from that space can be observed. As the oil is at low pressure, generally lower than the hydrostatic head of water in the surrounding sea at the level of the stern shaft, there is no possibility of this oil leaking past the sea-water seal to pollute the surrounding sea.

In the event of failure of the sea-water seal, the drain from the air space will normally cope with this but if, for any reason, the drain is blocked or cannot cope, or is deliberately shut off, and if therefore the sea-water gets past the outboard lip seal, the pressure in the region between the lip seals will rise and the sea water will be able to escape through the second drain. Flow through this drain can be caused to signal an alarm.

There may be flow-restricting means in the second drain, formed simply by a goose neck rising to a higher level than the level of oil in a static reservoir supplying the bearing.

The invention will now be further described by way of example with reference to the accompanying drawing which is an axial section through a bearing and seal assembly according to the invention.

A propeller boss 1 is carried by a stern shaft 2 passing through the stern frame 3 of a ship. The sea-water is excluded by a radial face seal comprising a rotating wearing element 4 secured to the propeller boss 2 and running against a stationary but flexibly mounted seal face member 5. A face seal is the preferred type to use at this point as it seals well against water without the need for any other lubricant. The flexibility can be imparted by mounting the member 5 on a single convolution bellows structure 6 which, in the example shown is built up in the manner that forms the subject of our British Pat. No. 986 217 and its Patent of Addition No. 1 099 688. The bellows structure is secured to the stern frame 3 by a mounting ring 7 within which are secured two lip seals 8 and 9, the seal 8 facing inboard and the seal 9 facing outboard. The lips run not in direct contact with the shaft 2 but on a sleeve 10 which can be replaced in the event of wear and which is sealed to the propeller boss 1 by a sealing ring 11.

The shaft 2 runs in a journal bearing 12 mounted in the stern frame 3 and at the inboard end of the bearing is a lip seal 13 facing outboard and running on a wearing sleeve 14 secured to the shaft. In view of the low pressure under which the bearing operates, it would be possible to use a labyrinth seal at this point instead of a lip seal.

Within the stern frame 3 are two drain passages, namely a first passage 15 at the 'six o'clock' or lowest position, draining to the bilge of the ship the air space between the sea-water seal 4, 5 and the first lip seal 8, and a second passage 16 at the '12 o'clock' or highest position, leading from the annular space between the two lip seals 8 and 9. Both passages carry control cocks, as indicated at 15' and 16' respectively.

The assembly is completed by the provision of a low level header tank 17 at a level slightly above the bearing 12, carrying oil and connected to the inboard end of the bearing through a pipe 18. The tank is not under pressure and so the pressure at the bearing 12 is simply that due to the static head of oil in the tank 17, which is small in comparison, for example, with the draught of the ship, and bears no relation to the depth of the shaft 2 below the sea-water surface.

It will be understood that, if desired, the pipe 18 may be connected to the midpoint of the bearing 12 through a passage in the stern frame 2, or there could be connections from the tank 17 to both ends of the bearing.

The passage 16 from the space between the seals 8 and 9 contains a swan-neck 19 that is above the normal level of the surface of the oil in the tank 17 so that liquid can only flow from the space in question when the pressure in that space is higher than the static oil pressure.

Under normal operating conditions the sea-water is excluded by the face seal 4, 5 and any slight leakage across its face is collected in the free air space between this seal and the lip seal 8. The cock 15' is normally open so this leakage passes to the bilge through the pipe 15.

In the event of failure of the face seal 4, 5 there will be an excessive flow through the pipe 15. A sight glass (not shown) may be provided, if desired, to make this apparent. The controlling personnel will then close off the cock 15', the space between the seals 4, 5 and 8 will fill up and the sea-water will penetrate past the inboard-facing lip seal 8. The resulting pressure on the outwardly facing lip seal 9 will help to make that seal water-tight and so no sea water will reach the bearing 12. Instead the pressure in the space between the seals 8 and 9 will rise and there will be a controlled flow of sea-water to the bilge through the pipe 16 and the swan-neck 19. By partly closing the cock 16' the personnel can keep up the pressure in the space between the seals to ensure a good sealing action by the seal 9. Under these emergency conditions the shaft 2 can be kept running under power and the ship is able to reach dock for repair, relying simply on the outboard-facing seal 9 to keep the oil and the sea-water apart. Even under these conditions there can be no danger of pollution of the sea by oil as the oil is at a much lower static head than the sea.

In the event, on the other hand, of the main oil-retaining lip seal failing there will be no problem at all as the oil pressure will simply be applied then to the inboard-facing lip seal 8 and will act to urge that seal into contact with the sleeve 10. If both the lip seals 8 and 9 were to fail, the only result would be a loss of oil to the bilge through the drain passage 15 and this could be observed either by seeing the flow to the bilge or observing the fall in the level of the tank 17. At all events, the oil would still be fully lubricating the bearing 12.

It will thus be seen that the assembly described allows continued operation without danger of pollution even in the event of seal failures; this is largely attributable to the fact the oil is only at a low static head, lower than the sea-water outside. Moreover, as the lip seals 8 and 9 can be mounted, as shown, within the mounting ring of the face seal member 5 the overall seal assembly takes up little axial space and so the propeller boss 1 has only a small overhang beyond the bearing 12.

We claim:

1. A stern seal and bearing assembly for ships comprising a bearing, a stern shaft rotatable in said bearing, means for supplying low pressure oil to said bearing, said bearing having inboard and outboard ends, a first seal assembly mounted at the outboard end of said bearing, a second seal assembly axially spaced away from said first seal assembly in a direction away from said bearing, a stern frame, said stern frame having mounted therein said first and second seal assemblies and said bearing and defining, between said seal assemblies, a void space, and means draining said void space, said first seal assembly comprising two lip seals spaced apart axially to define a second void space and directed towards one another, and means draining said second void space.

2. The stern seal and bearing assembly set forth in claim 1 wherein said means draining said second void space include pressure-loaded means preventing escape from said second void space except at a pressure higher than the pressure of said low pressure oil supply means.

3. The stern seal and bearing assembly set forth in claim 1 including a third seal assembly at said inboard end of said bearing.

4. A stern seal and bearing assembly for ships comprising a bearing, a stern shaft rotatable in said bearing, means for supplying low pressure oil to said bearing, said bearing having inboard and outboard ends, a first seal assembly mounted at the outboard end of said bearing, a second seal assembly axially spaced away from said first seal assembly in a direction away from said bearing, a stern frame, said stern frame having mounted therein said first and second seal assemblies and said bearing and defining, between said seal assemblies, a void space, and means draining said void space, said first seal assembly comprising two lip seals spaced apart axially to define a second void space and directed towards one another, and means draining said second void space, said means draining said second void space include pressure-loaded means preventing escape from said second void space except at a pressure higher than the pressure of said low pressure oil supply means, said oil supply means comprising an unpressurized oil tank having a static head above said bearing and said pressure-loaded means comprising a swan neck pipe in said means draining said second void space, said swan neck pipe including a portion at a higher level than said tank.

5. A stern seal and bearing assembly for ships comprising a bearing, a stern shaft rotatable in said bearing, means for supplying low pressure oil to said bearing, said bearing having inboard and outboard ends, a first seal assembly mounted at the outboard end of said bearing, a second seal assembly axially spaced away from said first seal assembly in a direction away from said bearing, a stern frame, said stern frame having mounted therein said first and second seal assemblies and said bearing and defining, between said seal assemblies, a void space, and means draining said void space, said first seal assembly comprising two lip seals spaced apart axially to define a second void space and directed towards one another, and means draining said second void space, said second seal assembly comprising a rotary mechanical face seal.

6. The stern seal and bearing assembly set forth in claim 5 wherein said second seal assembly includes a stationary mounting ring attached to said stern frame and wherein said first seal assembly is mounted in said mounting ring.

7. A stern seal and bearing assembly for ships comprising a bearing, a stern shaft rotatable in said bearing, means for supplying low pressure oil to said bearing, said bearing having inboard and outboard ends, a first seal assembly mounted at the outboard end of said bearing, a second seal assembly axially spaced away from said first seal assembly in a direction away from said bearing, a stern frame, said stern frame having mounted therein said first and second seal assemblies and said bearing and defining, between said seal assemblies, a void space, and means draining said void space, said first seal assembly comprising two lip seals spaced apart axially to define a second void space and directed towards one another, and means draining said second void space, wherein said oil supply means comprises an unpressurized oil tank having a static head above said bearing.

* * * * *